Feb. 28, 1928.
F. W. SCHWERDTFEGER ET AL
1,660,530
AIRCRAFT STATION
Filed Dec. 16, 1925
4 Sheets-Sheet 1
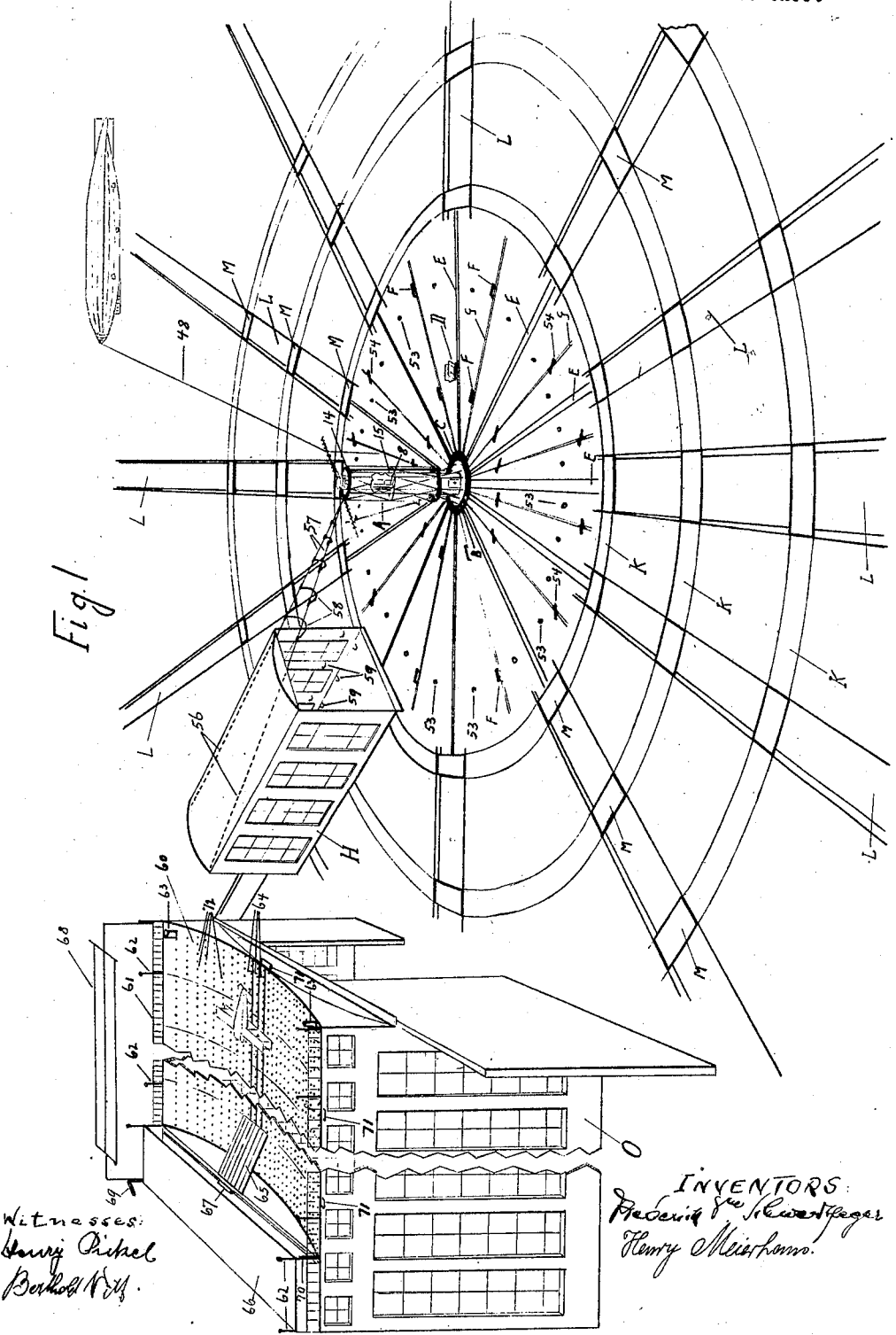

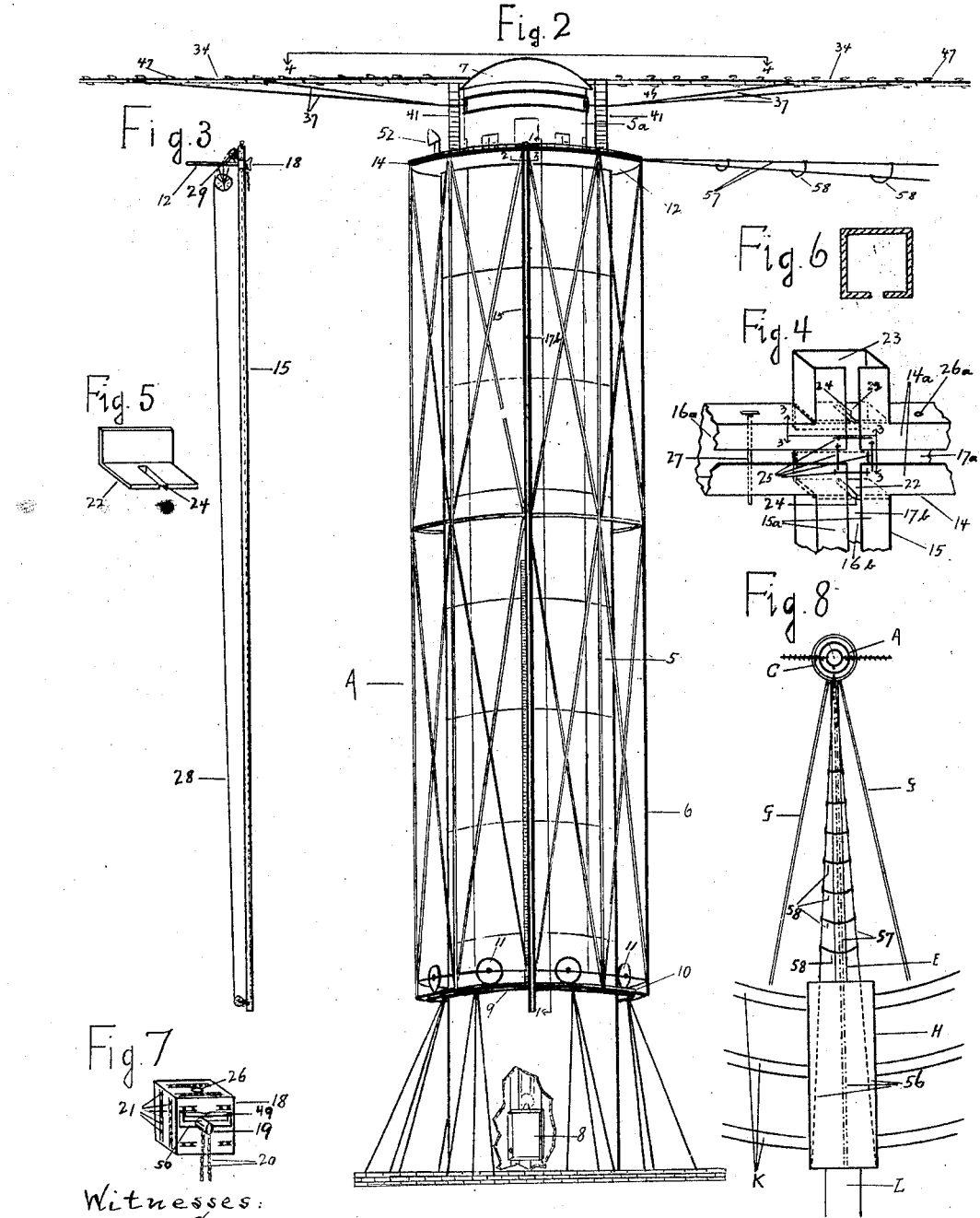

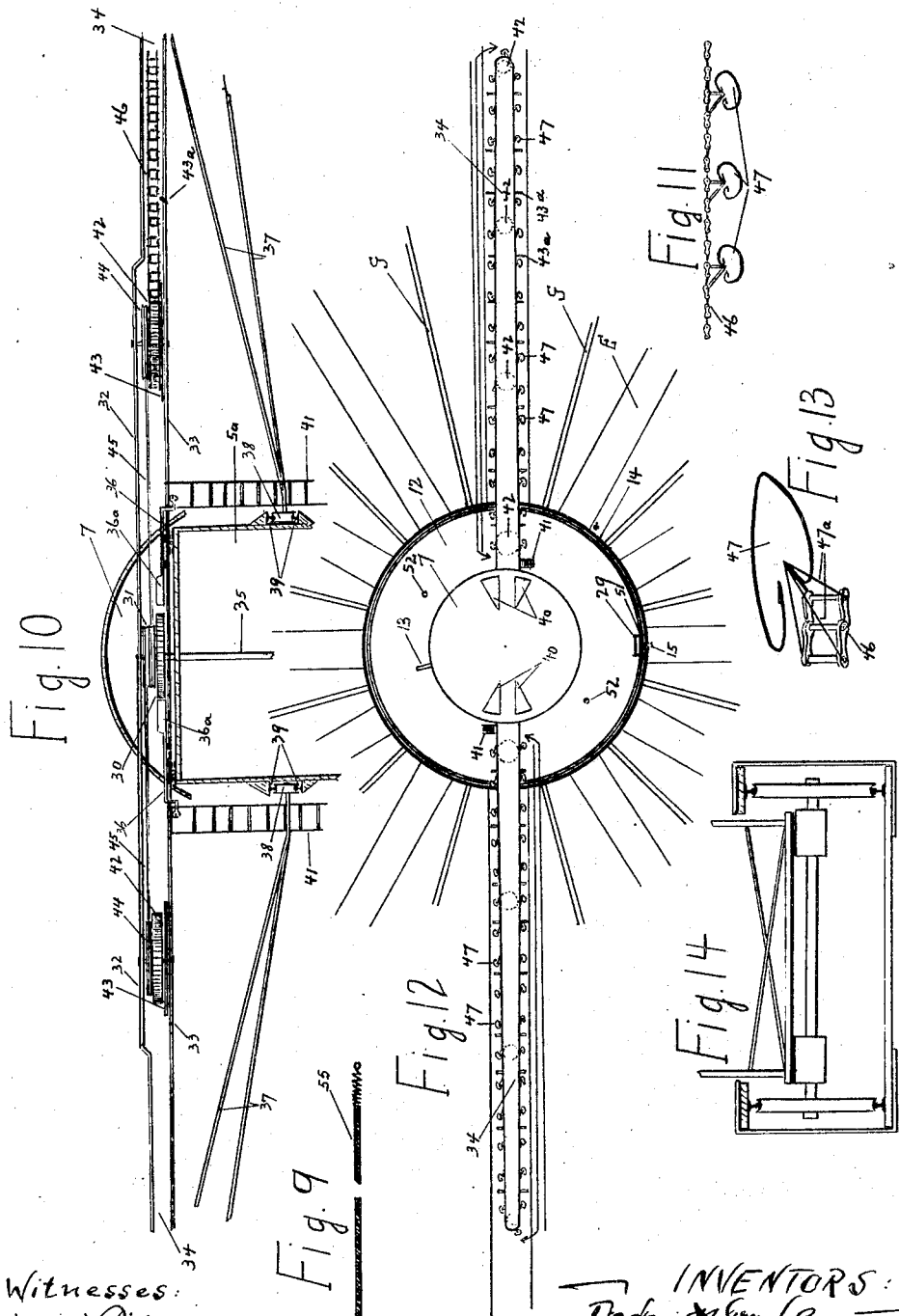

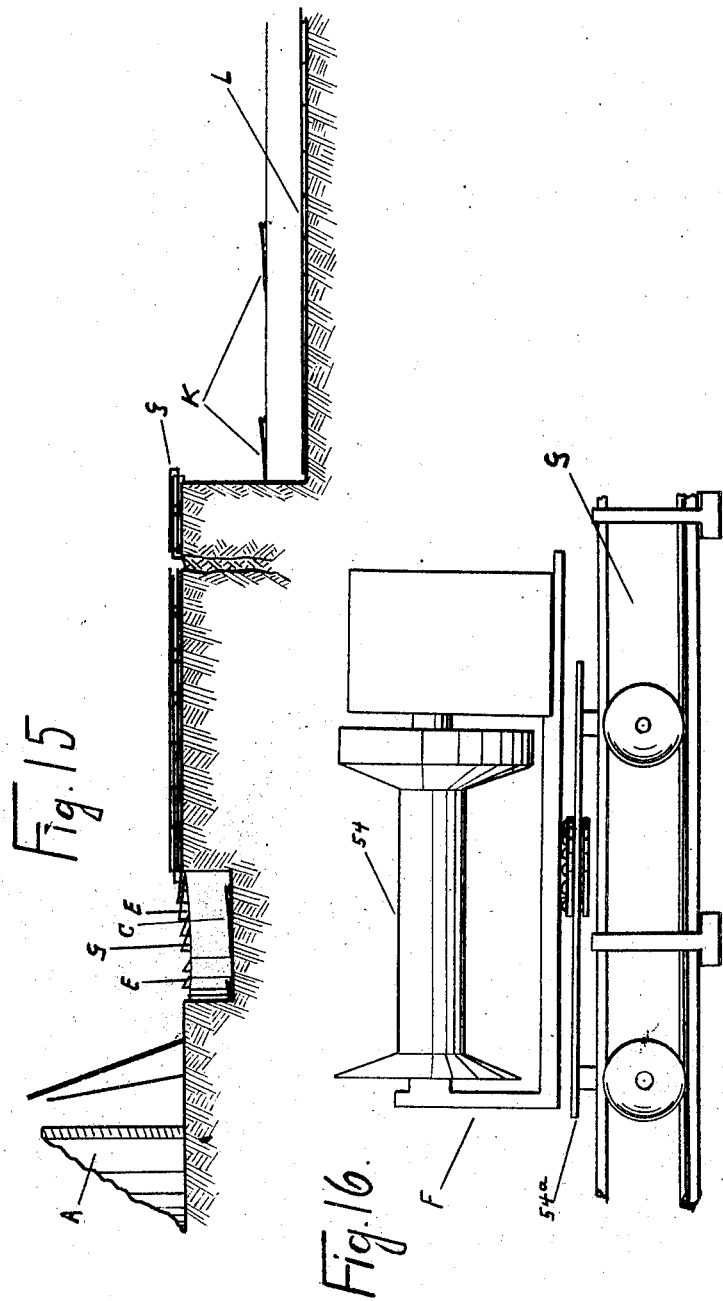

Patented Feb. 28, 1928.

1,660,530

UNITED STATES PATENT OFFICE.

FREDERICK W. SCHWERDTFEGER AND HENRY MEIERHANS, OF NEW YORK, N. Y.

AIRCRAFT STATION.

Application filed December 16, 1925. Serial No. 75,810.

Our invention relates to an aircraft station in which a number of airship-sheds or hangars may operate in combination with a mooring tower, independently from said tower to any distance outward from said station, and in combination with a mother-hangar.

Aircraft stations having a number of tracks radiating from a common center to a like number of stationary hangars arranged in a circular position around said common center, are known. Only taking into consideration that, during the moving of an airship into the most suitable of these hangars or during the removal of an airship from any of same, the direction of the wind may change, the disadvantage of such stationary hangars is obvious.

Some of the principal objects of our invention are to safely land, berth, and launch airships, their bow-end-on to the prevailing wind, to permit an airship, anchored to the mooring tower, to float with the wind and to be raised and lowered alongside the mooring tower, to furnish a removable airship-transport between the mooring tower and a movable airship-shed or hangar, to provide a track-system which permits the manœuvring of a large number of such sheds or hangars, first, round about a centrally located airship-anchorage, and second, in an outward direction to different, distant terminals as cities, railroad stations, and to such places which prohibit a direct landing of airships, and to furnish a mother-hangar for the purpose of taking in or letting off freight, passengers, et cetera, and for harboring airships and movable hangars.

Important objects of our invention are to provide, for obvious reasons, shock-absorbers in mooring ropes and to furnish means, especially in winches, adapted to prevent a twisting of ropes connecting an airship swaying in the air, with its station.

Among the further objects of our invention are to combine with this station such devices as are necessary for the proper maintenance of aircraft and its station, as a radio and a weather observation station, gas-reservoirs, a station for aeroplanes, observation balloons et cetera, to properly lay out this entire station within a rather small area, and to confine its labor forces to a comparatively small number.

In the drawings,

Fig. 1 is a perspective of a station for aircraft, embodying parts of our invention; the mother-hangar, the outer circular track, and the outer ends of the outer radial tracks shown incomplete;

Fig. 2 is a vertical view of the mooring tower, a portion of its wall broken away to show the elevator within the tower;

Fig. 3 is a vertical side view of the dependent carrier-guide which can also be seen on the line 1—1 of Fig. 2;

Fig. 4 illustrates perspectively the crossing of the dependent carrier guide with the circular carrier-guide, said crossing indicated in Fig. 2 by the line 2—2.

Fig. 5 is a perspective view of a sliding lid shown on the lines 3—3 of Fig. 4;

Fig. 6 shows the hollow, rectangular shape of the carrier-guides mentioned under Fig. 4;

Fig. 7 is a perspective view of a guide-weight fitting into the carrier-guides shown in Figs. 4 and 6;

Fig. 8 is a plan view of a fragment of Fig. 1 and shows the mooring tower, an inner circular track therearound, a portion of an outer circular track, a hangar on same with its entrance facing the mooring tower, a number of tracks radiating from the inner circular track toward the outer circular track, a cable-track between the mooring tower and the hangar, equipped with movable airship-berthing girths and indicated, partly, by broken lines and, in a narrowed position, by dot-and-dash lines, and a portion of a track radiating from the outer circular track;

Fig. 9 is a fragmentary view of an airship-hauling and anchoring rope, made elastic by the insertion of a spiral-spring;

Fig. 10 is a vertical sectional view of the uppermost part of the mooring tower as shown in Fig. 2 on the line 4—4, after the removal of parts of the side-arms;

Fig. 11 is a plan view of a section of an endless roller chain equipped with line-grabbing hooks;

Fig. 12 is a plan view of the mooring tower, also showing the arrangement of radial ground-tracks;

Fig. 13 refers to Fig. 11 and illustrates the self-adjusting attachment of a line-grabbing hook to the outer rim of an endless roller chain;

Fig. 14 shows a channel-rail track provided to resist an upward lift therefrom, and an airship-receiving vehicle;

Fig. 15 is a vertical section indicating, on a larger scale than in Figs. 1 and 8, the inner circular track sunken around the mooring tower shown fragmentarily, the outer circular track, a number of tracks, shown partly broken, radiating from the inner circular track toward the outer circular track, and a track crossing the outer circular track and extending outwardly therefrom;

Fig. 16 is a side view of a winch having a horizontally adjustable drum-structure for winding, unwinding, and holding ropes.

With reference to the drawings, this station for landing and starting airships and smaller aircraft comprises a mooring tower A, a trench traverser B movable along a sunken, circular track C concentric with said mooring tower, an airship-receiving vehicle D movable along the radial tracks E, a number of winches or windlasses F movable along the radial tracks G, a hangar H movable laterally along a circular track K concentric with said mooring tower, and longitudinally along the radial tracks L by means of the trench traversers M to a mother-hangar O or to another point of destination, said radial tracks L, being sunken where they are crossing said circular track K, continue outward from said circular track K and connect this station with remote places.

The mooring tower A comprises a stationary structure 5, an outer frame 6 rotatable around the latter, a stationary cabin 5ᵃ, and a rotatable roof-structure 7 above said stationary cabin.

The stationary structure 5 houses an elevator mechanism 8, a number of motors as needed for the operation of this mooring tower, water- and oil-pipes, tools, repair-parts, etc., for this station, and has a circular collar 9 projecting from round about its lower section. A circular rail 10, concentric with said stationary structure, is imbedded into said collar. The wheels 11 of the rotatable frame 6 are adapted to run along said circular rail 10.

The stationary cabin 5ᵃ occupies the center-part of the top of the stationary structure 5 and leaves the outer part of said top as a support for the inner rim of the ring-plate 12 which is concentric with the stationary structure 5 and forms the uppermost portion of and is secured to the rotatable frame 6. The ring-plate 12 surrounds the stationary cabin 5ᵃ and is adapted to be locked thereto at any point therearound by means of the stopper 13. The rotation of the frame 6 is controlled by a gear-wheel, vertically placed in the upper part of the stationary structure 5, rotatable, and adapted to engage with a corresponding, circular and cogged rail which is embedded into the bottom side of the ring-plate 12.

The circular carrier-guide 14, concentric with the stationary structure 5, is secured to the outer edge of the upper ring-plate 12 of the rotatable frame 6 and crosses the dependent carrier-guide 15 (Fig. 4) which is secured longitudinally to said rotatable frame. The hollow, rectangular shape of said carrier-guides 14 and 15 forms a circular channel track 16ᵃ within the circular carrier-guide 14 and a downward channel track 16ᵇ within the dependent carrier-guide 15. A slot 17ᵃ and 17ᵇ, respectively, between the weight-guiding flanges 14ᵃ and 15ᵃ furnishes a narrow, central surface of said channels and opens same toward the outside of the tower A.

A guide-weight 18 (Fig. 7) fits into the channel-tracks 16ᵃ and 16ᵇ and is movable therealong. The nose 19 of said guide-weight projects outwardly from the aforesaid slots. The chains or ropes 20, attached to the outer part of the nose 19, serve to fasten a load to said guide-weights. The ball-bearings 21 in the side-walls of said guide-weights reduce the friction.

As shown in Fig. 4 the circular channel 16ᵃ can be put in junction with the downward channel 16ᵇ and vice versa by removing the lower sliding lid 22 through a slot in the rear wall of the dependent carrier-guide 15. The forepart of the sliding lids 22 is adapted to be placed flush with the channel track 16ᵃ, to lock the downward channel track 16ᵇ, and to make the circular channel track 16ᵃ endless. The upper sliding lid 22 is likewise removable. The aperture 23 of the dependent carrier-guide 15 serves as an inlet for said guide-weights. The rear ends of said sliding lids are turned and serve to press against the outside of the rear wall of the dependent carrier-guide 15, thus increasing the stability of said sliding lids and of a guide-weight 18 passing between them. A slit 24, splitting the front section of the fore part of each sliding lid 22, opens same toward the slot 17ᵇ.

The stoppers 25 are adapted to lock a guide-weight 18 within the crossing (Fig. 4) and are removable from across the slots 17ᵃ and 17ᵇ.

A vertical hole 26 throughout the center of each guide-weight 18 corresponds with a number of holes 26ᵃ in the top-wall and the bottom-wall of the circular carrier-guide 14, so that a plug 27, inserted into a hole 26ᵃ of said top-wall can pass through the vertical hole 26 of a guide-weight 18 and enter a corresponding hole 26ᵃ in said bottom wall, thus locking said guide-weight, or two plugs may be used for the same purpose in such a manner that said guide-weight will be locked between them.

When a guide-weight 18 occupies the channel-space where the carrier-guides 14 and 15 are crossing each other (Fig. 4), the slit 24 of the upper sliding lid 22, the vertical hole 26 of said guide-weight and the slit 24 of the lower sliding lid 22 form a composite, vertical opening, so that a rope or chain, let down through the aperture 23 of the dependent carrier-guide 15, will pass through said composite, vertical opening, can be lowered along the channel track 16$^b$, either to be connected to the winch-cable or chain 28 which is operated by the winch 29 (Fig. 3), or brought into another winch below said dependent carrier-guide. Either of these connections accomplished, that portion of the cable or chain which rests within the vertical hole 26 of the guide-weight 18, is locked therein by means of a plug or the like inserted via a slot in the rear wall of the dependent carrier-guide into a corresponding hole in the rear wall of said guide-weight, said latter hole in communication with the vertical hole 26. After the removal of the sliding lids 22, the guide-weight 18 and a load, attached thereto, can be hauled safely along the channel track 16$^b$.

The rotatable roof-structure 7 (Fig. 10), concentric with the stationary cabin 5$^a$, houses a gear-wheel 30 and a number of transmission cable-wheels 31 horizontally between the top-blade 32 and the bottom-blade 33 of the side-arms 34. These wheels 30 and 31 are horizontally rotatable with the shaft 35, said shaft adapted to be operated by hand or motor. The side-arms 34 are secured to the and within the rotatable roof-structure 7, and extending in horizontal direction therefrom.

Each of the two bars 36, slidable along a track within the horizontally rotatable roof-structure 7, has a spade-shaped forepart 36$^a$, which is adapted to engage the groove between two adjoining teeth of the gear-wheel 30. Said slidable bars 36 can be operated by hand from the outside of the roof 7. The gear-wheel 30, engaged by a slidable bar 36, controls the operation of the rotatable roof-structure 7.

Each of the two side-girder structures 37, supporting the side-arms 34, has a wheel 38 adapted to run along the circular, channelled rail 39, which rail is concentric with the stationary cabin 5$^a$ and secured thereto. The lids 40 give access to the interior of the roof-structure 7.

A ladder 41 suspends from each side-arm 34.

A number of chain-wheels 42, placed horizontally at intervals between the top-blade 32 and bottom-blade 33 of each side-arm 34 by means of a pivot and socket arrangement, are horizontally rotatable.

A cable-wheel 44 is secured to the upper side of and horizontally rotatable simultaneously with that chain-wheel 42 in each side-arm 34 which is the nearest to the rotatable roof-structure 7.

An endless transmission cable 45 connects each cable-wheel 44 with a transmission cable-wheel 31 in a horizontal direction.

An endless transmission chain 46 is horizontally movable along all chain-wheels 42 in each side-arm 34. A plurality of line-grabbing hooks 47 is horizontally attached at intervals to the outer rim of each endless chain 46 by means of self-adjusting joints 47$^a$, which permit said hooks 47 to take curves. The idlers 43$^a$, suitably attached to the bottom blade 33, and the flanges 43, projecting from all around the bottom side of each chain-wheel 42 serve as a guide and support for each endless transmission chain 46. The hooks 47, extending into the open air, are destined to entangle a line 48 or the like lowered from an airship. The aforesaid transmission mechanism serves to carry the entangled line 48 to within the reach of an attendant.

The rotation mechanism of the roof-structure 7 serves to put the side-arms 34 in such a position that an airship, approaching the mooring tower A, can throw or shoot off a line 48 accurately.

A line 48, disentangled from a hook 47, is inserted below the circular groove of the roller 49 of the device 50, which device is securely attached to the nose 19 of each guide-weight 18, and thence into the winch 51 on the ring-plate 12 of the rotatable frame 6.

A searchlight 52 is suitably placed on the upper part of this mooring tower.

The trench traverser B furnishes a movable extension for the tracks E and G radiating from the circular, sunken track C toward the outer circular track K and equipped with channel-rails (Figs. 14, 15, and 16) to resist an upward lift therefrom.

The airship-receiving vehicle D and the winches or windlasses F are transferable from one to another of the tracks E and G, respectively by means of the trench traverser, B, which tracks E and G are laid preferably alternately.

The drum-carrying structure 54 of the winches F (Figs. 1 and 16) serves to wind, to unwind, and to hold a rope and is adapted to turn horizontally and to adjust itself independently from its vehicle-body 54$^a$ into a horizontal position corresponding to the changeable position of a floating airship for instance, with which it is connected by means of a rope, in order to prevent the twisting of ropes connecting a floating airship and a number of said winches.

The hooks and rings 53, anchored into the ground between the tracks E and G, are provided as an emergency means to hold down airship ropes and the like.

Elastic ropes 55 are furnished to connect a floating airship and its station, to diminish shocks, to relieve strain, and to prevent breakage, and may be composed, as shown in Fig. 9, of a rope and a spiral spring.

A suspended cable-track 56, placed along the interior of the movable hangar H and indicated in Figs. 1 and 8 by a broken line and, in a narrowed position, in Fig. 8 by a dot-and-dash line within the hangar H, is adapted to be raised and lowered by a pulley-device and to be communicated with one end of a corresponding cable-track 57, the other end of which is removably attachable to the nose 19 of a guide-weight 18 slidable along the carrier-guides 14 and 15. Thus, a composite cable-track 56 57, connecting the hangar H with the mooring tower A, can be raised and lowered and moved around about said mooring tower.

The flexible, padded airship-berthing girths 58 are movable independently from each other along the cable-tracks 56 57, hang loose therefrom by their movable ends, and form a movable, adjustable and looped berth for airships. An airship may be placed therein either by its top, by its bottom, or, in case two cable-tracks are employed one above the other, by its top and its bottom and fastened thereto by any suitable means. To safely move an airship, thus berthed, into the hangar H or to remove it therefrom, especially during windy weather, it is provided to be fastened by its fore-end to an airship-receiving vehicle D and may be held, furthermore, toward the ground by ropes engaging a winch F or any of the hooks and rings 53.

The hangar H is equipped with hooks 59 or the like for the purpose to fasten an airship thereto.

A series of sunken tracks L cross the circular track K, at intervals, and continue therefrom in any outward direction and in any elevation to different places, one of them being a mother-hangar.

The trench traversers M serve to complete the circular track K and as a means to remove a hangar H therefrom to a sunken track L and, consequently, to and along the outward extension thereof.

The interior of the mother-hangar O provides space for a number of airships, movable hangars H and sheds, vehicles et cetera, and has accommodations for the dispatch of passengers and freight.

The roof 60 of the hangar O is equipped as a station for aeroplanes and balloons and is longitudinally curved downwardly. The side-railings 61 of said roof furnish a guard for aeroplanes landing on and starting from said roof, and also for persons, and serve as a part-support for a number of signal-lights 62 and for searchlights 63.

The tracks or channels 64, placed along the lowest center portion of said roof, are tapering and, in combination with the aforedescribed roof, serve to guide a landing aeroplane in a destined direction. A brake-shoe of the aeroplane may be applied to said tracks or channels 64 for the purpose to reduce the landing speed of same to a minimum, while the sloping plank 65, bridging the roof 60 with the aeroplane shed 66, serves to fully break the aforesaid minimum-speed of a landing aeroplane, but vice versa will increase the speed of an aeroplane which leaves the shed 66 for a flight.

The advantage of the winch 67, which is movable along the entrance of the shed 66, is obvious.

A radio station, its antenna 68 placed above the roof 60 in a position which does not interfere with landing and departing aeroplanes, is also provided in this hangar O.

The movable indicator 69 and a speaking tube 70 serve to transmit messages from above to below the roof 60 and vice versa.

A number of anchor-hooks 71, set into and around the roof 60, is adapted to receive ropes depending from balloons and other aircraft.

A large number of lights 72, installed within the roof 60, serves to illuminate the interior of the hangar O and the surroundings of the roof 60 simultaneously.

All parts, exposed to friction in the aforedescribed aircraft station, are provided with suitable anti-friction means.

We do not limit ourselves to the wording of this specification and to the accompanying drawings, but we also claim all modifications and alterations which come within the scope and spirit of our invention, especially with regard to the elevation of tracks and to the replacement of movable hangars by other means.

We claim:—

1. In a mooring tower of an airship station, a frame rotatable round about a stationary structure and adapted to be locked thereto, a hollow-shaped, longitudinally slotted carrier-guide dependent from the rotatable frame, rotatable therewith, and having a channel-track and safety guide-flanges for a guide-weight, and a guide-weight provided to receive a load and to haul same along said channel-track.

2. In a mooring tower of an airship station, a frame rotatable round about a stationary structure and adapted to be locked thereto, a circular carrier-guide attached to the rotatable frame and having safety guide-flanges and a circular channel-track for a guide-weight, and a guide-weight provided to receive a load, movable along said channel-track, and adapted to be locked thereabout.

3. In a mooring tower of an airship station, a frame rotatable round about a stationary structure and adapted to be locked thereto, a carrier-guide dependent from the rotatable frame and a circular carrier-guide located round about same, said carrier-guides in communication with each other, a guide-weight movable therealong, provided to receive a load, and adapted to be locked and to be shifted from the circular carrier-guide to the dependent carrier-guide and vice versa.

4. In a mooring tower of an airship station, a frame rotatable round about a stationary structure, a channel-track dependent from the rotatable frame, a circular channel-track located round about the same, said channel-tracks in communication with and crossing each other, means to lock them from each other and to make the circular track endless, a guide-weight movable along said channel-tracks and adapted to guide a load upwardly, downwardly, and around the mooring tower.

5. An airship station comprising a hangar movable along a circular track located round about an airship anchorage, a suspended cable-track provided to connect the airship anchorage with the hangar and movable round about said anchorage, and a number of airship-berthing girths movable along said cable-track.

6. An airship station comprising a mooring tower, a circular track located round about it, a hangar movable along the circular track, a cable-track provided to connect the mooring tower and the interior of the hangar and adapted to be raised and lowered and to be moved round about the mooring tower, and an airship-receiving vehicle adapted to guide an airship along said cable-track into and from the hangar.

7. An airship station comprising a centrally located airship anchorage, a circular track therearound, a sunken track radiating from the circular track, a trench traverser movable along said sunken track and having a track adapted to be communicated with said circular track, a hangar movable along the circular track and transferable to the trench traverser, a suspended cable-track within the hangar and another suspended cable-track without the hangar, adapted to form a composite cable-track for an airship between the anchorage and the hangar and movable round about said anchorage, and means to transport an airship along said composite cable-track.

8. An airship station comprising an airship anchorage, a circular track therearound, a number of sunken tracks crossing the circular track, an extension of the sunken tracks in outward direction, a trench traverser movable along said sunken tracks and along the extensions thereof, a hangar movable along the circular track and transferable to upon the trench traverser, a mother-hangar, and means of communication between the circular track and the mother-hangar.

9. In combination with an aircraft station, a mother-hangar furnishing shed-space for a number of airships and movable hangars, a hangar-roof longitudinally curved downwardly and provided as an aeroplane station, a railing along said roof, a lighting system of the roof, a track located along the deepest-lying portion of the roof and adapted to direct a landing aeroplane and to engage a brake shoe thereof, a shed occupying a part of the roof, a sloping plank connecting the shed with the roof, a number of signal-lights, of aircraft-anchorages, and a searchlight about the roof, and means to communicate messages between parts of the mother-hangar.

10. An aircraft station comprising a centrally located mooring tower, a circular carrier-guide and a dependent carrier-guide thereof adapted to rotate horizontally, a guide-weight movable along said carrier-guides and provided to guide an airship upwardly, downwardly and around the mooring-tower, a hangar movable, with its entrance facing the mooring tower, round about the same, a removable cable furnishing an airship-track between the hangar and the mooring tower and adapted to be raised and lowered and to be moved round about the mooring tower, an airship-berth movable along said cable, and means to remove the hangar in an outward direction.

In witness whereof, we have hereunto subscribed our names.

FREDERICK WM. SCHWERDTFEGER.
HENRY MEIERHANS.